United States Patent [19]

Roder

[11] 3,731,911

[45] May 8, 1973

[54] DEVICE FOR RAISING AND LOWERING THE TORCHES OF A FLAME CUTTING MACHINE

[75] Inventor: Georg Röder, Frankfurt/Main, Germany

[73] Assignee: Messer Griesheim GmbH, Frankfurt Germany

[22] Filed: Nov. 2, 1970

[21] Appl. No.: 86,073

[52] U.S. Cl. .................................266/23 M, 83/564
[51] Int. Cl. .............................B23k 7/02, B23k 7/10
[58] Field of Search ................266/23 K, 23 M, 23 R, 266/23 T; 148/9; 83/564, 12

[56] References Cited

UNITED STATES PATENTS 2,206,969  7/1940  McNutt.............................266/23 M 3,518,907  7/1970  Pinel..................................83/564 X

FOREIGN PATENTS OR APPLICATIONS 1,058,815  6/1959  Germany...........................266/23 M

*Primary Examiner*—Robert D. Baldwin
*Attorney*—Connolly and Hutz

[57] ABSTRACT

A device for raising and lowering torches of flame cutting machines includes parallel swivel levers mounted about a common horizontal axis with a rod extending between the free ends of the levers and the torches mounted to the rod. A resilient restoring force is utilized to hold the torches in the driving position, while an activation arrangement is utilized for overcoming the restoring force.

10 Claims, 4 Drawing Figures

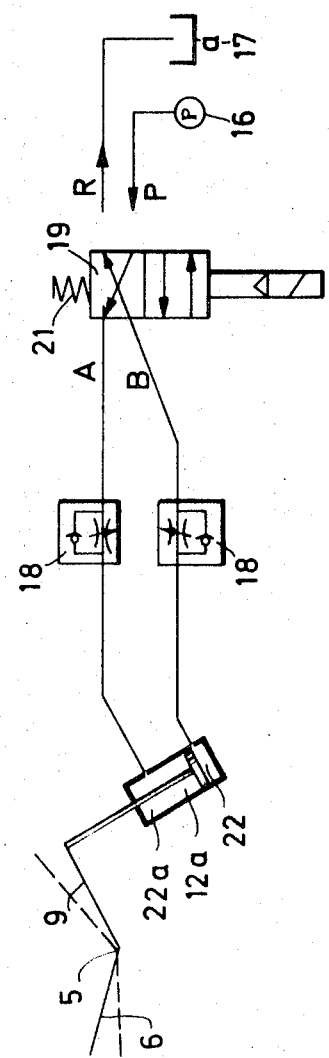
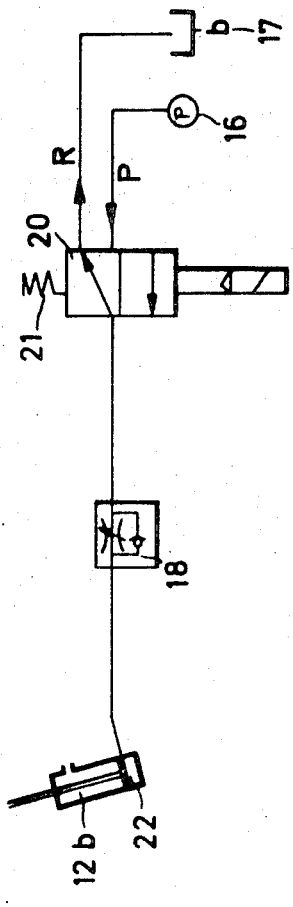
Fig. 3a
Fig. 3b

DEVICE FOR RAISING AND LOWERING THE TORCHES OF A FLAME CUTTING MACHINE

BACKGROUND OF INVENTION

In flame cutting machines, which are used for the mechanical cutting to size of perfectly fitted strip portions from plates and sheet bars, the drag torch holders with the torches are raised from the machine table at the end of the cutting process in order to avoid damages during the return movement of the carriage. For this purpose, the drag torch holder is generally provided with a pivoting support, which, on the one hand, in combination with a scanning roller arranged at the drag torch holder maintains a constant distance between torch and work piece and on the other hand enables a swinging up of the drag torch holder into a return position. The raising and swinging up of the swiveling torch holder is generally done singly by hand by the machinist, the drag torch holder being held in its high position by means of a chain attachable at the machine framework. This manner of operation is cumbersome, strenuous, and in addition requires a constant observation as well as an increased carefulness on the part of the machinist. The individual activation of the drag torch holder is time-consuming and therefore leads to looses especially with respect to larger machine units. A further essential disadvantage is also that an inattentively undertaken or an inadvertently released arresting leads to a falling down of the torch container into the operating position or — depending on the swivel angle of the turning support — below that position something which can cause damage to the machine. A still further disadvantage is also in the disruption of the carriage advance, perhaps as a result of untimely disruption of the current supply and the consequently required torch stoppage may cause damages to the work piece and to the torch.

For the simplification as well as particularly for acceleration of the operation, it is also known to effect the upward pivoting of all drag torch holders at the end of the cutting process at the same time with the help of a raising device which essentially consists of a hoist activated manually by means of a spoked wheel which in turn affects by means of a wire cable the swiveling arm arrangement on whose free end is mounted a horizontal pipe or rod which holds the hoisting chains for the drag torch holder. With the help of this arrangement, it is indeed possible to activate several drag torch holders at the same time; the activation, however, occurs in a manner essentially similar to that described above, so that with the help of this arrangement, the described functional disadvantages are not eliminated. In addition, this known arrangement, with increasing machine size in view of the load increasing with the increase of the number of torches, requires an over-proportionally increasing constructional expenditure serving the simplification of servicing.

SUMMARY OF INVENTION

The object of the present invention is to provide a raising device of the described type, which enables an automatic lowering and raising of the drag torch holder at the beginning or at the end of a cutting process and assures a safety of the machine during breakdowns. The invention consists of having the swiveling arm arrangement held by means of a resilient restoring force in its position in which it raises the drag torch holder into return or driving position. Also provided is an activating arrangement, with the help of which its swiveling, reacts against the effect of the tensed resilient restoring force, to move the elements into the position corresponding to the operating setting of the drag torch holder as well as to hold the elements in this position.

By use of the novel arrangement, there is achieved not only an automation of a previously manual process, but also a securing of the torch of the torch cutting machine and of the processed work piece. In this respect, in contrast to the known devices, with the occurrence of operational troubles — when the elements are in their return or inoperative position — a lowering of the torch holders into their lower work position is prevented. Conversely, when in the operating setting of the torch holders, a raising into the return setting is effected. In addition, the arrangement enables a partially or fully automatic control of the raising arrangement.

In a specific embodiment, the swivel arm arrangement may consist of a double-armed lever system with an activating lever whose free end affects a tractive force sufficient for the raising of the drag torch holder by a tension spring urging a torch raising. The lever is also connected to the piston rod of a pressure means cylinder with the cylinder, preferably affected at both sides, provided as the pressure means cylinder. However, a unilaterally affected cylinder, operating against the effect of the tension spring, may also be provided.

The control of the pressure means cylinder in this instance occurs advantageously with the help of an electromagnetic valve, which by energization is pushed into its switch position producing an impingement of the cylinder to cause the torch lowering. Upon deenergization, under the effect of a spring, there is effected a pressure release of the cylinder.

With the help of this control, the drag torches are secured with respect to any type of operational trouble, i.e., both with pressure medium loss as well as with disruption of the current supply. The restoring spring effects a raising of the drag torch holder independently of the valve position as a consequence of the pressure drop setting in the pressure means conduit, the pressure drop effecting a depressurization of the pressure means cylinder. In contrast, with a drop or any other interruption of the current provision, there sets in a deenergization of the electromagnetic valve, which is pressed under the effect of the valve spring into its position deenergizing the lowering chamber of the pressure medium cylinder, so that the swivel arm arrangement is activated by the spring in the sense of a raising of the drag torch holder.

THE DRAWINGS

FIGS. 3a and 3b are schematic showings of a control for the raising arrangement illustrated in FIGS. 1 and 2.

DETAILED DESCRIPTION

Figure 1:
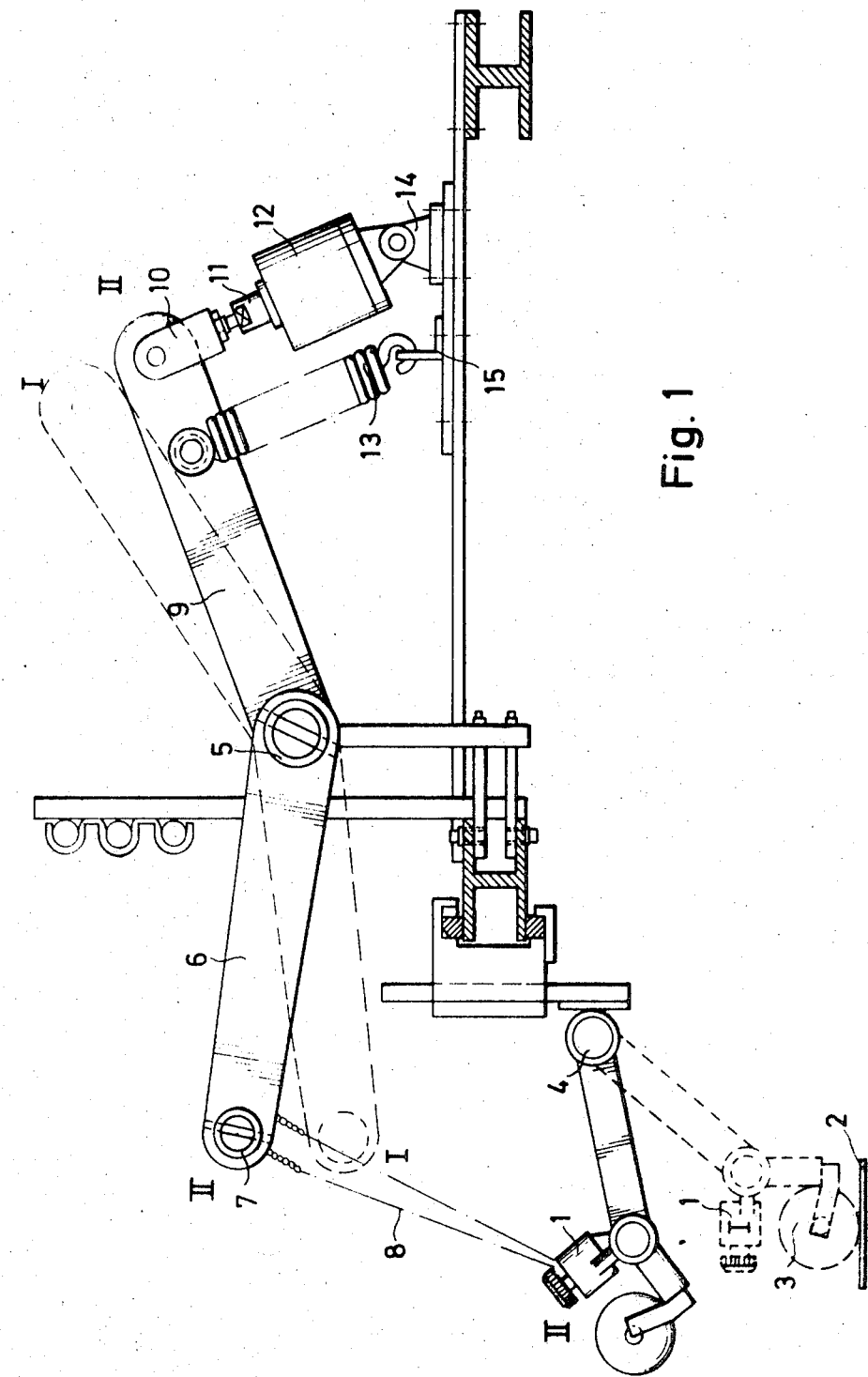
FIG. 1 is a side view of a raising arrangement according to the invention.

In the drawing, the drag torch holders are designated with 1, which on the one hand are provided with a scanning roller 3 holding the drag torch holders during operation at uniform height over work piece 2 and furthermore with a swivel support 4, which on the one hand is a prerequisite for the effectiveness of scanning roller 3 and on the other hand enables an upswinging of the drag torch holder 1 from the working position I into its return position II. The raising and lowering of the drag torch holder occurs essentially with the help of the swivel arm arrangement consisting of parallel swivel arms 6 arranged rigidly at swivel axis 5, a supporting rod 7 for the chains 8 attached at a drag torch holder each being held between the free ends of the swivel arms. The swivel axis 5 is freely turnable in supports 5a.

According to the invention, the swivel arm arrangement is held in its position in which it raises the drag torch holder 1 into return position by means of a resilient restoring force and is provided with an activating arrangement with the help of which a turning of the swivel arm arrangement against the effect of the tightening restoring force is effected into its position corresponding to the operating position of the drag torch holder as well as its holding in this position.

In the illustrated example, the swivel arm arrangement is expanded into a double-armed lever system which aside from the swivel arms 6 and rod 7 encompasses the activating lever 9, also rigidly connected with the swivel axis 5. On the free end of the activating lever 9 there are arranged on the one hand over the end piece fork 10 the piston rod 11 of a pressure means cylinder 12 and on the other hand a tension spring 13. The pressure means cylinder 12 is freely turnable in a plane in pivot support 14, while spring 13 with its other end is inserted into an eye of the support plate 15. The pressure means cylinder may be a hydraulic or pneumatic cylinder affected unilaterally or bilaterally.

Figure 2:
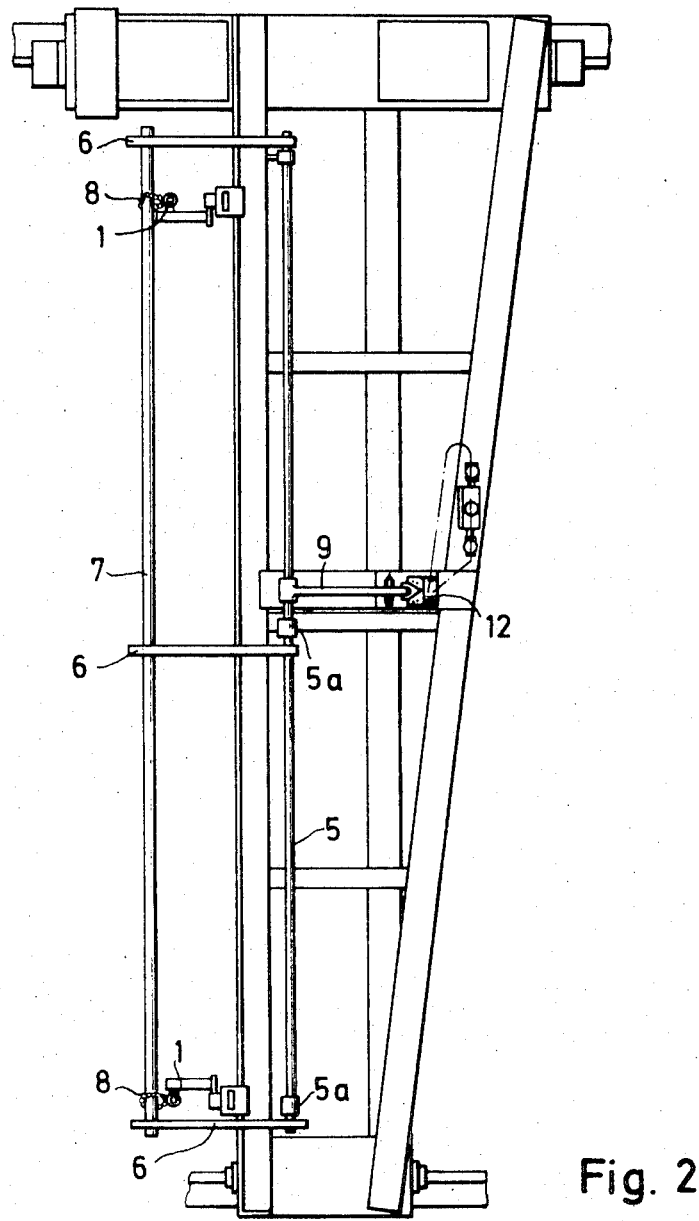
FIG. 2 is a top plan view of the arrangement shown in FIG. 1.

A valve arrangement serving the control of the pressure means cylinder is schematically illustrated in FIG. 3, wherein the corresponding parts are designated with the same numerals as in FIGS. 1 and 2, and in which the representation 3a reproduces the control of a doubly affected cylinder, and the representation 3b the control of a singly affected cylinder. Here the pump is designated with 16, the return with 17, and the regulating valves with 18 in each pressure means conduit. An electromagnetic 4/2-way valve is designated with 19 and an electromagnetic 2/2-way valve with 20; which are held by a spring 21, each pressed into the position, in which the cylinder chamber 22, when being affected by pressure means, a lowering of the drag torch holder setting in, is connected with the return. In energizing the electromagnetic valve, there occurs a valve displacement into the other switch position, however, in which the chamber 22 is affected and consequently the drag torch holder is lowered.

The novel device operates as follows:

At the beginning of the cutting process, the machinist energizes the electromagnetic valve 19 or 20 by switch pressure, the valve then being pressed from the position illustrated into a position effecting an impingement of the cylinder chamber 22. As a result of the impingement of this chamber, the double lever arrangement 9/6 is moved about the swivel axis 5 from its position II illustrated into its position I, the pressure spring 13 being tightened on the one hand and the drag torch holder 1, on the other hand, is lowered about the swivel support 4 from its return position II into its operating I until scanning rollers 3 are situated on work piece 2. In this position occurs the process of the main portal.

At the end of the cutting process — manually or by means of a limit switch — there occurs the de-energization of the magnetic valve 19 or 20, whereupon valve 19 or 20 is pressed back into its illustrated position by the effect of spring 21. Thereby chamber 22 is depressurized so that the entire arrangement is brought into its starting position II by the effect of spring 13. In case of a control according to FIG. 3b, the return of the arrangement occurs solely due to the effect of spring 13, while in the case of the design of FIG. 3a, the raising occurs with the support by cylinder 12a, whose chamber 22 in this position is connected with the pump.

The control occurs essentially in the same manner with a disruption of the pressure means provision or of the electrical current provision, in which instances spring 13 automatically and without any special control command effects a raising of the drag torch holder into its return position. In a disruption of current, the raising of the drag torch holder occurs in the above-described manner on the basis of de-energization of magnetic valve 19 or 20, while in an interruption of the pressure means provision, the raising of the drag torch holder into the return position occurs as a result of the pressure release setting in in chamber 22 of pressure means cylinder 12.

The invention is represented by way of an example of a swivel lever arrangement with pressure means activation and tension spring return. However, there are also other designs possible. In another design, the same in principle, the swivel arm arrangement, for example, may be held by means of a torsion spring of spiral spring connected at the swivel axis 5 in return position with a motorized activation affected in a suitable manner by means of a magnetic coupling also at the swivel axis for the bringing about of the swiveling of the arrangement in operating position.

What is claimed is:

1. A device for the raising and lowering of torches in a flame cutting machine comprising, in combination, a plurality of torches, holding and moving means for each torch, each holding and moving means including a scanning roller extending below its torch whereby said roller contacts the workpiece to maintain its torch spaced from the work piece, a swivel support, each torch connected for pivotal movement about said swivel support, a pivotable swivel arm for each torch, motion transmitting means connecting each torch to its swivel arm to transmit the motion of said swivel arm to said torch for selectively pivoting said torch about its swivel support to its operative position and its inactive position, a single activation means for said torches including a common shaft, each swivel arm being mounted on said shaft for joint movement therewith, an activating lever connected at one end thereof to said shaft for causing said shaft to rotate and said swivel arms to pivot, resilient means reacting against the other end of said activating lever to pivot said lever in a direction for urging said torches to the inactive position, piston-cylinder means connected to said other end of said activating lever to overcome the force of said resilient means for smoothly moving said torches simultaneously to the operative position, and a single control means for actuating said piston-cylinder means.

2. A device as set forth in claim 1 wherein said motion transmitting means includes swivel arms extending over the machine width, and chain means mounting said torches to said rod, and said swivel support extending over the machine width.

3. A device as set forth in claim 2 wherein said resilient means being a tension spring reacting against said activating arm, said piston-cylinder means including a piston rod connected to said activating arm, said piston rod being movable in a pressure means cylinder.

4. A device as set forth in claim 3 wherein said cylinder is a bilaterally affected cylinder.

5. A device as set forth in claim 3 wherein said cylinder is a unilaterally affected cylinder.

6. A device as set forth in claim 5 wherein control means causes the actuation of said piston rod in said cylinder, said control means including an electromagnetic valve with a magnet and a valve spring, energization of said magnet causes said valve to pressurize said cylinder, and deenergization causes said valve spring to depressurize said cylinder.

7. A device as set forth in claim 4 wherein control means causes the actuation of said piston rod in said cylinder, said control means including an electromagnetic valve with a magnet and a valve spring, energization of said magnet causes said valve to pressurize said cylinder, and deenergization causes said valve spring to depressurize said cylinder.

8. A device as set forth in claim 3 wherein control means causes the actuation of said piston rod in said cylinder, said control means including an electromagnetic valve with a magnet and a valve spring, energization of said magnet causes said valve to pressurize said cylinder, and deenergization causes said valve spring to depressurize said cylinder.

9. A device as set forth in claim 1 wherein said resilient means is a spring, and said activation means including a motorized drive coupled to said lever.

10. A device as set forth in claim 9 wherein said motorized drive is coupled to said lever by a magnetic coupling.

* * * * *